United States Patent [19]

Swenson et al.

[11] 3,985,568

[45] Oct. 12, 1976

[54] PIGMENT SUSPENDING AGENTS IN PAINT SYSTEMS

[75] Inventors: Carl Richard Swenson, Berkeley Heights; Frank C. Naughton, Mountainside; Armando Franco, Monmouth Junction, all of N.J.

[73] Assignee: NL Industries, Inc., New York, N.Y.

[22] Filed: May 15, 1975

[21] Appl. No.: 577,780

[52] U.S. Cl. ................................ 106/171; 106/245; 260/22 A
[51] Int. Cl.² .................... C08L 1/08; C08L 91/00
[58] Field of Search ........... 106/245, 247, 249, 270, 106/271, 268, 245; 260/22 A

[56] References Cited
UNITED STATES PATENTS

| | | | |
|---|---|---|---|
| 2,266,843 | 12/1941 | Beach | 260/400 |
| 3,123,488 | 3/1964 | Lindlaw | 106/268 |
| 3,184,323 | 5/1965 | Lindlaw | 106/268 |
| 3,562,194 | 2/1971 | Offermann | 260/22 A |

Primary Examiner—Theodore Morris

[57] ABSTRACT

The instant application covers the use of a heat-stable composition of matter useful for modifying the rheological and suspension properties of non-aqueous fluid systems containing finely divided solid particles. The heat-stable composition of matter comprises a creamy paste of finely divided particles of an emulsifiable polyethylene wax suspended in a sulfated-sulfonated castor oil solution.

4 Claims, No Drawings

PIGMENT SUSPENDING AGENTS IN PAINT SYSTEMS

BACKGROUND OF THE INVENTION

Many agents have been added to paint systems in the past to prevent the pigment from settling in the can or to prevent the paint from sagging after it has been applied to a surface.

The instant invention particularly is concerned with a combination of two such agents. The first agent is an emulsifiable polyethylene wax which has been used primarily to prevent settling. It is identified and defined in U.S. Pat. No. 3,123,488 by William Lindlaw. In this patent its use is described as modifying the rheological and suspension properties of non-aqueous fluid system containing finely divided solid particles. In addition, it is particularly effective when used in the 130° to 180° F. range.

The other agent is a sulfated-sulfonated castor oil which is useful as a suspending agent for pigments in paint and to prevent sagging of the paint film.

The instant application covers the use of both of these agents in combination with one another to obtain a synergistic effect to prevent settling and may be incorporated in paint systems using a wide range of temperatures in incorporating the agent into the paint system.

SUMMARY OF THE INVENTION

The instant invention covers the use of two rheological and suspension agents in paint systems, said agents being finely divided particles of an emulsifiable polyethylene wax suspended in a sulfated-sulfonated castor oil solution. The amounts of the two agents being from 1 to 30 lbs. per hundred gallons of paint. The amount of emulsifiable polyethylene wax being 1 to 6 parts for each part of the sulfated-sulfonated castor oil.

It has been found that when the combination of the two agents are employed as anti-settling agents that a synergistic effect is obtained since the settling is reduced. In most cases the amount of the combined agents used may be reduced to obtain the same degree of suspension when either of the two components are used separately.

DESCRIPTION OF THE PREFERRED EMBODIMENTS

The type of emulsifiable polyethylene wax employed is more fully described in U.S. Pat. No. 3,123,488. Briefly, however, these waxes should have a molecular weight of from about 1500 to about 6000, preferred from 2000 to 2500, and an acid number from about 2 to about 50, 7 to 50 being preferred.

The sulfated-sulfonated castor oil is prepared by reacting castor oil with sulfuric acid to form a liquid mixture of sulfated and sulfonated castor oil.

The sulfated-sulfonated castor oil is then diluted with an organic solvent which is used in the coating industry and the emulsifiable polyethylene wax is added to the solution. Any well-known aromatic or aliphatic mixtures of solvents may be used, particularly those which are economical, such as e.g. mineral spirits, xylene and the like. The mixture is then heated with agitation to 200° to 220° F. until the wax is completely melted and a uniform liquid mass is obtained. The heated mass is then cooled rapidly with high shear to form a homogeneous creamy paste. This creamy paste may then be employed in various paint systems to prevent settling.

As previously stated, the amount of the creamy paste mixture employed in the paint system should be from 1 to 30 lbs. per hundred gallons of paint. The amount of emulsifiable polyethylene wax present in the paste should be from 1 to 6 parts for each part of the sulfated-sulfonated castor oil.

When the emulsifiable polyethylene wax was used alone according to U.S. Pat. No. 3,123,488, the temperature of grinding should lie above 100° F. When the paint suspensions are produced at temperatures below 100° F., larger amounts of the agent must be employed to obtain the same effect. At these higher grinding temperatures the viscosities of the paints are stabilized and therefore the suspension is improved while the sagging tendency is reduced.

In contrast to the prior art, when the creamy paste of the instant invention is employed, the grinding temperature may be reduced to a temperature as low as 80° F. without sacrificing the effectiveness of the suspending properties.

The effectiveness of the suspending agents of this invention and of other known suspending agents was determined by their use in various paint and other formulations. In the normal paint formulation technique which was utilized, a stiff paste was first prepared by pre-mixing a portion of the vehicle, all of the pigment, and the suspending agents. This paste was ground on a three-roll or other mill, and the ground effluent was let down with the remainder of the vehicle; the drier and anti-skinning agent were also added at this stage.

As regards the various tests which were performed on the finished paints and the like, the fineness of grind was determined by the use of a Hegman fineness gage. The gage readings run from 0 to 8. with 0 indicating a particle size of 4 mils or larger, while 8 represents maximum fineness. This determination was used as a means of demonstrating the heat stability characteristics of a paint or similar composition, since a considerable increase in particle size shows that such a composition is definitely unstable at the elevated test temperature.

The heating of the paint or other compositions was effected at various elevated temperatures, with the composition being placed in a can in an oven at the desired temperature for 7 days or until earlier heat stability failure of the paint was observed. After cooling of the composition, its appearance was observed both in the can and after a draw down, e.g., a 3 mil wet film, of the composition had been prepared on a standard hiding power chart by the use of a film applicator. Such observation readily revealed whether the composition had been adversely affected by its subjection to the elevated temperature.

The degree of settling was determined by the ASTM Standard Method of Test D869-48 (Reapproved 1970) for Evaluating Degree of Settling of Traffic Paint. This test is the most useful in quantitatively evaluating the degree of pigment or other fine particle settling in paints or other compositions during shelf storage. While the method of test is designated "Degree of Settling of Traffic Paint" it is applicable to all pigmented compositions.

In order to describe the instant invention in more detail the following examples are presented:

EXAMPLES 1a,b,c

Example 1a — The creamy suspending agent of the instant invention comprising a combination of an emulsifiable polyethylene wax and the sulfated-sulfonated castor oil which had been prepared by melting a mixture of the emulsifiable polyethylene wax and the sulfated-sulfonated castor oil in mineral spirits until the mixture became homogeneous and then cooled was added to a white baking enamel to show the superior suspending results obtained over using either of the agents separately.

The emulsifiable polyethylene wax was used alone in Example 1b, while the sulfated-sulfonated castor oil was used alone in Example 1c.

The white baking enamel was prepared as follows:

Into a pebble mill using the proper size of loading, the following materials were used to manufacture 100 gallons of finished paint:

| Ingredients | Pounds Per Hundred Gallons |
|---|---|
| Titanium Dioxide Pigment | 240 |
| Barytes (Natural Barium Sulfate) | 240 |
| Alkyd Resin (41% Phthalic Anhydride, Soybean Oil Modified, 50% Non-volatile in Xylol) | 250 |
| High Flash Naphtha (K.B. 90 Distillation Range 315–350°F.) | 50 |
| Suspending Agent (as above) | As Required |
| Grind paste in pebble mill at specified temperature and to specified fineness of grind 18–24 hours. Add | |
| Alkyd Resin (41% Phthalic Anhydride, Soybean Oil Modified, 50% Non-Volatile in Xylol) | 300 |
| High Flash Naphtha (K.B. 90 Distillation Range 315–350°F.) | 76 |
| Urea Formaldehyde Resin (50% Non-volatile in 50–50 Blend of Xylol and Butanol) | 50 |
| Total | 1206 |

In Example 1a, 8 pounds of the creamy mixture of emulsifiable polyethylene wax and the sulfated-sulfonated castor oil were added to the ingredients in the pebble mill before grinding. The creamy mixture contained 4 parts of the former for each part of the latter.

After allowing the paint to stand on the shelf for 3 months, a settling reading was taken and it was found to be 10 (according to the 10–0 scale where 10 is the least settling while 0 is the most settling).

In Examples 1b and 1c the procedure was repeated with only the emulsifiable polyethylene wax used in Example 1b and only the sulfated-sulfonated castor oil used in Example 1c. Again after 3 months the paint of Example 1b showed a rating of 2 while the paint of Example 1c showed a rating of 8.

EXAMPLES 2a,b,c

In these runs, Examples 1a,b,c were repeated except that 12 pounds of the same suspending agents were used in place of 8 pounds. The settling results are recorded in the Table along with those of Examples 1a,b,c.

EXAMPLES 3a,b,c–5a,b,c

In these examples the procedure of Examples 1a,b,c, were repeated except that different paint compositions were employed. A vinyl red lead primer was used in Examples 3a,b,c. A chlorinated rubber primer was used in Examples 4a,b,c and a nitrocellulose lacquer was used in Example 5a,b,c. Again the results are recorded in the Table.

EXAMPLES 6a,b,c–8a,b,c

In these examples an automobile body primer was used and the suspending agents were used in varying amounts. In Examples 6a,b,c, 5 lbs. per 100 gallons were employed while 10 and 15 pounds were used in Examples 7a,b,c and 8a,b,c, respectively. All of these results are also recorded in the Table.

EXAMPLES 9a,b–12a,b

In these examples the creamy suspending agent of the instant invention, i.e. the combination of the emulsifiable polyethylene wax and the sulfated-sulfonated castor oil in xylene was added to the white baking enamel used in Example 1 at 10 lbs. per 100 gallons of paint and the agent was incorporated at various temperatures i.e. 80°, 90°, 100° and 110° F. For comparison purposes, the emulsifiable polyethylene wax was used alone under the same conditions. The results of these runs are recorded in Table II which show the degree of settling at the various temperatures. The Table also shows the fineness of grind of each paint sample used in the settling tests.

EXAMPLES 13a,b–16a,b

Using the same procedure as that described in Examples 9a,b–12a,b, the same runs were made using an automobile body enamel instead of a white baking enamel. The results are also recorded in Table II.

Substantially the same results have been obtained using other emulsifiable polyethylene waxes from well-known commercial sources where the molecular weight varies from 1500–3000. The ratio of the wax to sulfated-sulfonated castor oil was also varied from one to six to one.

From the above examples it has clearly been shown that by using the creamy composition of the instant invention which contains a mixture of an emulsifiable polyethylene wax and sulfated-sulfonated castor oil that surprising suspending properties are obtained when the instant composition is used in paint systems. Apparently a synergistic effect is obtained when the combination of agents are employed.

While this invention has been described and illustrated by the examples shown, it is not intended to be strictly limited thereto, and other variations and modifications may be employed within the scope of the following claims.

TABLE I

| Example No. | Paint Employed | Agent Used | Pounds/100 Gal. | Settling Months | Settling Reading |
|---|---|---|---|---|---|
| 1a | White Baking Enamel | Emulsifiable polyethylene wax + sulfated-sulfonated castor oil | 8 | 3 | 10 |
| 1b | White Baking Enamel | Emulsifiable polyethylene wax | 8 | 3 | 2 |
| 1c | White Baking Enamel | Sulfated-sulfonated castor oil | 8 | 3 | 8 |
| 2a | White Baking Enamel | Emulsifiable polyethylene wax + sulfated-sulfonated castor oil | 12 | 3 | 10 |

TABLE I-continued

| Example No. | Paint Employed | Agent Used | Pounds/100 Gal. | Settling Months | Settling Reading |
|---|---|---|---|---|---|
| 2b | White Baking Enamel | Emulsifiable polyethylene wax | 12 | 3 | 8 |
| 2c | White Baking Enamel | Sulfated-sulfonated castor oil | 12 | 3 | 6 |
| 3a | Vinyl Red Lead Primer | Emulsifiable polyethylene wax + sulfated-sulfonated castor oil | 8 | 3 | 10 |
| 3b | Vinyl Red Lead Primer | Emulsifiable polyethylene wax | 8 | 3 | 8 |
| 3c | Vinyl Red Lead Primer | Sulfated-sulfonated castor oil | 8 | 3 | 8 |
| 4a | Chlorinated Rubber Primer | Emulsifiable polyethylene wax + sulfated-sulfonated castor oil | 8 | 3 | 10 |
| 4b | Chlorinated Rubber Primer | Emulsifiable polyethylene wax | 8 | 3 | 10 |
| 4c | Chlorinated Rubber Primer | Sulfated-sulfonated castor oil | 8 | 3 | 2 |
| 5a | Nitrocellulose Lacquer | Emulsifiable polyethylene wax + sulfated-sulfonated castor oil | 8 | 3 | 10 |
| 5b | Nitrocellulose Lacquer | Emulsifiable polyethylene wax | 8 | 3 | 10 |
| 5c | Nitrocellulose Lacquer | Sulfated-sulfonated castor oil | 8 | 3 | 6 |
| 6a | Automobile Body Primer | Emulsifiable polyethylene wax + sulfated-sulfonated castor oil | 5 | 2 | 6 |
| 6b | Automobile Body Primer | Emulsifiable polyethylene wax | 5 | 2 | 0 |
| 6c | Automobile Body Primer | Sulfated-sulfonated castor oil | 5 | 2 | 6 |
| 7a | Automobile Body Primer | Emulsifiable polyethylene wax + sulfated-sulfonated castor oil | 10 | 2 | 8 |
| 7b | Automobile Body Primer | Emulsifiable polyethylene wax | 10 | 2 | 2 |
| 7c | Automobile Body Primer | Sulfated-sulfonated castor oil | 10 | 2 | 6 |
| 8a | Automobile Body Primer | Emulsifiable polyethylene wax + sulfated-sulfonated castor oil | 15 | 2 | 10 |
| 8b | Automobile Body Primer | Emulsifiable polyethylene wax | 15 | 2 | 8 |
| 8c | Automobile Body Primer | Sulfated-sulfonated castor oil | 15 | 2 | 8 |

TABLE II

| Example No. | 9a | 9b | 10a | 10b | 11a | 11b | 12a | 12b |
|---|---|---|---|---|---|---|---|---|
| Paint Used | White Baking Enamel | | | | | | | |
| Suspending Agent Employed | EPW* +S-SCO** | EPW | EPW S-SCO | EPW | EPW +S-SCO | EPW | EPW +S-SCO | EPW |
| Fineness of Grind | 7 | 7 | 7 | 7 | 7 | 7 | 7 | 7 |
| Temp. °F. | 80 | 80 | 90 | 90 | 100 | 100 | 110 | 110 |
| Rate of Settling | 7 | 0 | 7 | 0 | 10 | 1 | 10 | 8 |

| Example No. | 13a | 13b | 14a | 14b | 15a | 15b | 16a | 16b |
|---|---|---|---|---|---|---|---|---|
| Paint Used | Automobile Body Primer | | | | | | | |
| Suspending Agent Employed | EPW* +S-SCO** | EPW | EPW +S-SCO | EPW | EPW +S-SCO | EPW | EPW +S-SCO | EPW |
| Fineness of Grind | 6+ | 6+ | 7 | 7 | 7 | 7 | 7 | 7 |
| Temp. °F. | 80 | 80 | 90 | 90 | 105 | 105 | 120 | 120 |
| Rate of Settling | 10 | 0 | 10 | 0 | 10 | 2 | 10 | 6 |

*Emulsifiable Polyethylene Wax
**Sulfated-Sulfonated Castor Oil

We claim:

1. A creamy paste comprising finely divided particles of an emulsifiable polyethylene wax suspended in a sulfated-sulfonated castor oil solution, said paste containing from 1 to 6 parts of said wax for each part by weight of said castor oil, said paste useful as a suspending agent for particles in a non-aqueous fluid system.

2. Composition according to claim 1 in which said wax has a molecular weight from 1500 to 6000 and an acid number from 2 to about 50.

3. A method for preparing a creamy paste useful as a suspending agent in a non-aqueous fluid system which comprises, dissolving a sulfated-sulfonated castor oil in an organic solvent, adding particles of an emulsifiable polyethylene wax to said solution, the amount of said wax employed being from 1 to 6 parts by weight for each part of said castor oil, heating the mixture until the wax is completely dissolved and a uniform solution is obtained, and rapid cooling with high shear to form a homogeneous creamy paste.

4. A paint system which contains as a suspending agent from 1 to 30 pounds of a creamy paste per hundred gallons of paint, said paste being finely divided particles of an emulsifiable polyethylene wax suspended in a sulfated-sulfonated castor oil solution, said paste containing from 1 to 6 parts of said wax by weight for each part of said castor oil.

* * * * *